(12) United States Patent
Crane et al.

(10) Patent No.: US 6,755,332 B2
(45) Date of Patent: Jun. 29, 2004

(54) HINGED UTILITY RACK FOR VEHICLES

(75) Inventors: John H. Crane, Coatesville, PA (US); P. Joshua Crane, Coatesville, PA (US)

(73) Assignee: Factory Sports, Inc., Coatesville, PA (US)

( * ) Notice: Subject to any disclaimer, the term of this patent is extended or adjusted under 35 U.S.C. 154(b) by 72 days.

(21) Appl. No.: 10/214,282

(22) Filed: Aug. 6, 2002

(65) Prior Publication Data

US 2003/0029894 A1 Feb. 13, 2003

Related U.S. Application Data

(60) Provisional application No. 60/310,666, filed on Aug. 7, 2001.

(51) Int. Cl.[7] .................................................. B60R 9/00
(52) U.S. Cl. ..................... 224/321; 224/330; 224/506; 224/508; 224/553; 224/557; 414/462
(58) Field of Search .................................. 224/310, 315, 224/321, 330, 405, 494, 504, 505, 506, 507, 508, 553, 557; 414/462, 465, 466, 477, 478, 479, 480, 310, 546, 678

(56) References Cited

U.S. PATENT DOCUMENTS

| | | | |
|---|---|---|---|
| 3,777,922 A | * | 12/1973 | Kirchmeyer ................. 414/462 |
| 4,234,285 A | * | 11/1980 | Martinez .................... 414/462 |
| 4,277,008 A | | 7/1981 | McCleary |
| 4,538,752 A | * | 9/1985 | Welter ....................... 224/309 |
| 4,707,014 A | | 11/1987 | Rich |

(List continued on next page.)

OTHER PUBLICATIONS

HUMMBUG™ Assembly Manual (May 1998).
"Welcome to HUMMBUG On–Line," http://www.hummbug.com, 7 pp. (Apr. 6, 2001).
"Dominion Over the Earth," http://hummer.com, 8 pp. (Apr. 6, 2001).

*Primary Examiner*—Stephen K. Cronin
(74) *Attorney, Agent, or Firm*—RatnerPrestia

(57) ABSTRACT

A hinged utility rack disposed on and external to a vehicle having a temporary top or roof. The utility rack has a bed that supports objects especially for transportation. First and second support bars are attached to the vehicle and support the bed. The second support bar is releasably connected to the bed, supporting the bed when connected. A hinge pivotally connects the first support bar to the bed, enabling the bed to pivot about the first support bar. The bed pivots between (a) a closed position in which the bed covers the vehicle top and the second support bar is connected to the bed, and (b) an open position in which the second support bar is disconnected from the bed and the bed is disposed away from the second support bar thereby rendering the top accessible for removal or retraction.

18 Claims, 11 Drawing Sheets

U.S. PATENT DOCUMENTS

| | | | |
|---|---|---|---|
| 4,823,996 A | | 4/1989 | Mosher |
| 4,871,103 A | * | 10/1989 | Martinsson ................. 224/310 |
| 4,962,827 A | | 10/1990 | Garnett |
| 5,108,251 A | * | 4/1992 | Lougheed et al. .......... 414/546 |
| 5,171,083 A | | 12/1992 | Rich |
| D350,724 S | | 9/1994 | Lichtbach |
| 5,360,259 A | | 11/1994 | Lemberger |
| 5,381,939 A | | 1/1995 | Tippets |
| 5,450,296 A | | 9/1995 | McHugh |
| 5,492,259 A | | 2/1996 | Tippets |
| 5,560,701 A | | 10/1996 | Payne |
| D376,781 S | | 12/1996 | Ludewig et al. |
| 5,647,442 A | | 7/1997 | Lange |
| 5,699,944 A | | 12/1997 | Duran |
| 5,884,824 A | | 3/1999 | Spring, Jr. |
| D415,718 S | | 10/1999 | Aghaci |
| 6,015,074 A | | 1/2000 | Snavely et al. |
| 6,029,873 A | | 2/2000 | Won et al. |
| 6,068,168 A | | 5/2000 | Kreisler |
| 6,105,721 A | | 8/2000 | Haynes |
| 6,114,954 A | | 9/2000 | Palett et al. |
| D432,475 S | | 10/2000 | Hankinson |
| D434,718 S | * | 12/2000 | Kreisler ..................... D12/412 |
| 6,158,638 A | | 12/2000 | Szigeti |
| 6,308,874 B1 | | 10/2001 | Kim et al. |
| 6,338,427 B1 | | 1/2002 | Aftanas et al. |
| 6,338,428 B1 | | 1/2002 | Kawasaki et al. |
| 6,360,930 B1 | | 3/2002 | Flickenger |
| 6,425,508 B1 | * | 7/2002 | Cole et al. .................. 224/320 |
| 6,530,621 B1 | * | 3/2003 | Williams et al. ....... 296/216.04 |
| 2002/0045417 A1 | | 4/2002 | Homer, Sr. |
| 2002/0070255 A1 | | 6/2002 | Hebert et al. |
| 2002/0084297 A1 | | 7/2002 | Williams et al. |

* cited by examiner

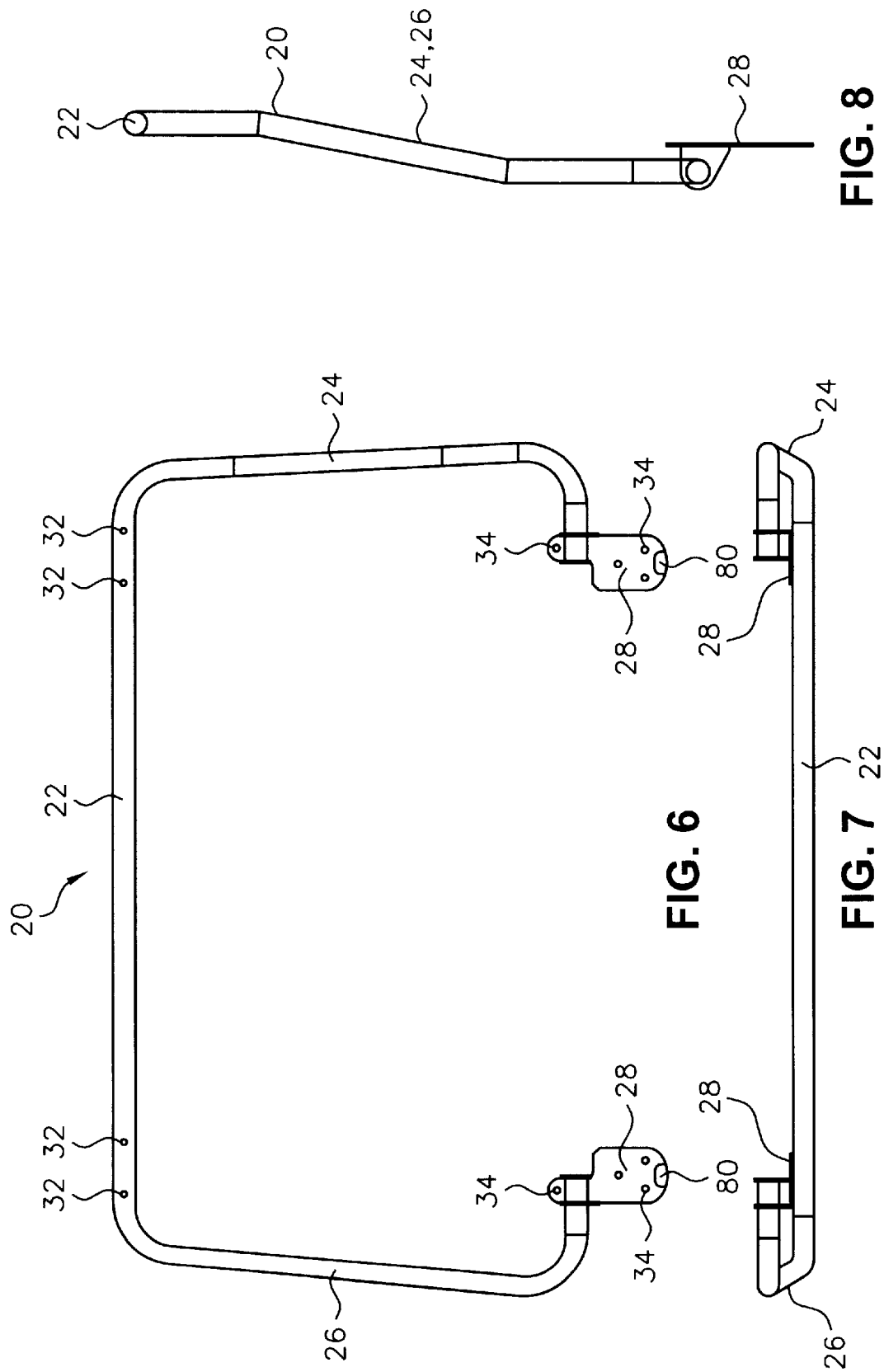

HINGED UTILITY RACK FOR VEHICLES

RELATED APPLICATION

This application claims the benefit of priority to U.S. Provisional Patent Application Serial No. 60/310,666, filed on Aug. 7, 2001, the contents of which are incorporated in this application by reference.

TECHNICAL FIELD

The present invention relates generally to a vehicle utility rack and, more particularly, to a hinged utility rack that allows the temporary roof of a vehicle to be removed without disengaging the utility rack from the vehicle.

BACKGROUND OF THE INVENTION

Even as vehicles become larger and provide increased storage space, the desire to carry more cargo in or on the vehicle remains. One response to that desire is a cargo rack, which is placed on the vehicle outside the passenger compartment. Cargo racks generally are adapted to carry skis, bicycles, storage units, and other items.

The art is replete with different designs and styles of cargo racks. One common feature of these racks is that they are typically secured to the vehicle roof. More specifically, they are rigidly mounted in a fixed position to the roof of the vehicle. The advantages of roof racks are many: they maintain sight lines, minimize aesthetic drawbacks, avoid interference with doors and windows, and allow maximum use of passenger space inside the vehicle.

In basic form, the roof rack has a pair of spaced parallel rails or load bars, fixedly attached to the roof and aligned parallel to the centerline of the roof or transversely to it. The rails are elevated a slight distance from the roof surface, generally three to five inches. The ends of the rails have end brackets which attach to the roof by sheet metal screws or the like and hold the rails at the predetermined height. In a common configuration, the brackets for the two transverse rails are adjustably mounted in fixed linear tracks along each side edge of the roof, allowing the user to set the spacing between the two rails. After-market versions of these generalized or multipurpose roof racks are provided that can be installed and removed from the vehicle and may include end brackets that screw into the roof gutters of the vehicle or clamp into the top of the side door openings.

Each particular type of cargo roof rack addresses a specific problem. For example, U.S. Pat. No. 6,029,873 issued to Won et al. teaches a roof rack assembly that enhances and improves the overall appearance and aerodynamics of a vehicle with the roof rack. The roof of the vehicle contains grooves making it possible to retract the roof rack to a stored position when not in use. Although aesthetically and aerodynamically improved, this roof rack requires extensive modifications to the vehicle roof.

Another problem presented by roof racks is the difficulty experienced by users when securing or storing cargo to or in the rack. Most vehicles are sufficiently tall that the roof is inaccessible to individuals of normal height. U.S. Pat. No. 6,308,874 issued to Kim et al. provides a roof rack that slides down the rear of the vehicle to allow a user to access the stowed cargo while standing on ground level. This rack eliminates the need for an elevation mechanism such as a step stool. The portion of the rack which does not slide must still be securely mounted to the vehicle roof.

The roof is a stable structure, and can support a conventional roof rack, in most vehicles. In some vehicles, however, the roof is removable, is not structurally sound, or both. Most vehicles having removable roofs are designed to allow open-air enjoyment. Such roofs can be either removable "hard" tops (i.e., temporary shells) or "soft" tops made of fabric, coated canvas, tarps, and the like. By removing the soft or hard top roofs, the enclosed vehicle is converted into an open-air vehicle.

Among the various types of convertible vehicles, sport-utility vehicles (SUV's) and all-terrain vehicles (ATV's) have gained widespread popularity in recent years. Generally, these vehicles have a box-shaped cab and include various features such as four-wheel drive and heavy-duty suspensions which allow them to be used in most environments including the off-road environment. Therefore, vehicles of these types are particularly well suited for transporting passengers to remote locations for participation in outdoor sports. Examples of such outdoor sports include skiing, snowboarding, canoeing, bicycling, fishing, and camping.

Many of these sports require specialized equipment for their participants. Among other bulky equipment, bicycling requires a bicycle; fishing requires fishing poles; canoeing requires a canoe; skiing requires the skis, poles, and boots; snowboarding requires a snowboard; and camping requires a tent. Such specialized equipment must be carried along with the user to the remote outdoor location.

A major disadvantage of such SUV's and ATV's is their relative lack of cargo space. Space within the passenger compartment is limited. For situations where large items are desired to be transported, the interior space of most SUV's and ATV's is inadequate. Given both the limited interior space and the size and shape of the equipment which owners of SUV's and ATV's desire to transport, such equipment is most effectively carried outside the vehicle on roof-mounted racks. Thus, roof racks are common on SUV's and on ATV's.

As outlined above, the art is replete with different designs and styles of roof racks. Nevertheless, relatively few solutions exist for convertible SUV's and ATV's. This shortage exists because most vehicle roof racks must be mounted to the roof of a hardtop vehicle for support. Convertible SUV's and ATV's do not have hard tops and, therefore, most conventional roof racks cannot be used with these vehicles. A fixed roof rack that requires mounting the rack to the vehicle roof is simply impractical with removable soft or hard top roofs. Although these difficulties are inherent for vehicle types known as SUV's and ATV's, the same problems exist with convertible automobiles and with vans and pickup trucks having caps or removable hardtops installed over their cargo decks.

Roof racks that do not require mounting to the roof do exist. Such roof racks present their own set of problems. The roof rack may be affixed to the vehicle through longitudinal support bars as taught, for example, by U.S. Design Pat. No. 415,718 issued to Aghaci. The longitudinal support bars are affixed to the front, sides, or back of the vehicle and travel up the vehicle frame to the vehicle roof. The roof rack bed is mounted to the longitudinal support bars with secure fixtures. The roof rack bed is not affixed to the vehicle roof and, therefore, the roof rack bed and longitudinal support bar connections are critical load-bearing, structural joints. As a consequence, the roof rack bed and longitudinal bars are commonly a continuous structure welded together for maximum strength. Once affixed to the vehicle, these roof racks are tedious to remove and are impractical for use with vehicles having soft or hard top roofs because opening, closing, removal, and replacement of the roof is difficult.

U.S. Pat. No. 6,068,168 issued to Kreisler discloses a vehicle rack assembly for mounting on a vehicle having a rollbar. The assembly offers a unitary rack member having side walls and a floor and bracket members for mounting the floor of the rack to the rollbar of the vehicle. For use with a convertible SUV or ATV having a roof, the assembly can further have grommet assemblies with seals for mounting around holes formed in the roof of the vehicle for receiving a portion of the bracket members so that the roof of the vehicle passes between the rollbar and the unitary rack member. Thus, modification of the roof (holes and seals must be provided) is required for the rack assembly to engage the rollbar.

None of these conventional solutions permits a removable soft top to be raised and lowered easily or a removable hard top to be removed and replaced easily. To overcome these shortcomings of a roof rack that requires modifications to the vehicle in order to mount the roof rack or a roof rack that impedes removal of a soft or hard top roof, a new hinged utility rack is provided. A principal object of the invention is to provide a hinged utility rack that can be raised and lowered thereby facilitating operation of the removable roof of the vehicle. A related object of the present invention is to provide an improved utility rack assembly that allows the temporary hard or soft top roof of a vehicle to be removed without having to remove the utility rack assembly. Another object is to provide a utility rack assembly that is designed so as not to impinge upon the vehicle roof.

It is still another object of the present invention to provide a utility rack assembly that is attractive and does not require any aesthetically undesirable supports. A further object is to provide a utility rack assembly constructed of substantially rust-proof, durable, light-weight material able to support weight from cargo. Still yet a further object is to provide a utility rack assembly designed in component parts for ease of shipping and installation. Another object of the invention is to provide a utility rack assembly which is relatively inexpensive to construct and maintain.

The invention also seeks to provide a utility rack which can accommodate one or more lights. An additional object of the present invention is to provide a utility rack which may be manually lowered or raised and locked. A related object is to provide such a device which may be electromechanically lowered or raised and locked. Yet another object of the present invention is to provide a utility rack which can be fitted to a variety of vehicle roof sizes and shapes.

SUMMARY OF THE INVENTION

To achieve these and other objects and in view of its purposes, the present invention provides a utility rack for a vehicle having a temporary (i.e., a removable or retractable hard or soft) top or roof and holes for mounting conventional vehicle components. The utility rack is adapted to be disposed on and external to the vehicle. Included in the utility rack is a bed for holding and transporting cargo and for supporting objects and people. A first support bar includes a first horizontal support section and two first vertical mounting sections attached to the vehicle by first mounting plate assemblies using the existing holes of the vehicle, and supports the bed. A second support bar includes a second horizontal support section and two second vertical mounting sections attached to the vehicle by second mounting plate assemblies using the existing holes of the vehicle, and supports the bed when connected to the bed.

A hinge pivotally connects the first horizontal support section of the first support bar to the bed, enabling the bed to pivot about the first horizontal support section of the first support bar. A clamping knob assembly releasably connects the second horizontal support section of the second support bar to the bed. Thus, the bed pivots between (a) a closed position in which the bed covers the roof or top of the vehicle and the clamping knob assembly connects the second horizontal support section of the second support bar to the bed, and (b) an open position in which the clamping knob assembly is disconnected and the bed is disposed away from the second horizontal support section of the second support bar thereby rendering the roof or top accessible for removal or retraction.

The two first vertical mounting sections and the two second vertical mounting sections are bent to position the utility rack with respect to the vehicle. A gas spring assembly is attached to the bed and to the first support bar for facilitating pivot of the bed between the open and closed positions. An additional and optional component of the utility rack is at least one floodlight mounted to the second support bar. Of import is that the utility rack nowhere contacts the roof or top of the vehicle but permits removal or retraction of the roof or top when the bed is in the open position.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 6 is a front view of one embodiment of the rear support bar of the vehicle utility rack according to the present invention;

FIG. 7 is a top view of the rear support bar shown in FIG. 6;

FIG. 8 is a side view of the rear support bar of the vehicle utility rack shown in FIG. 6;

DETAILED DESCRIPTION OF THE INVENTION

Figure 1:
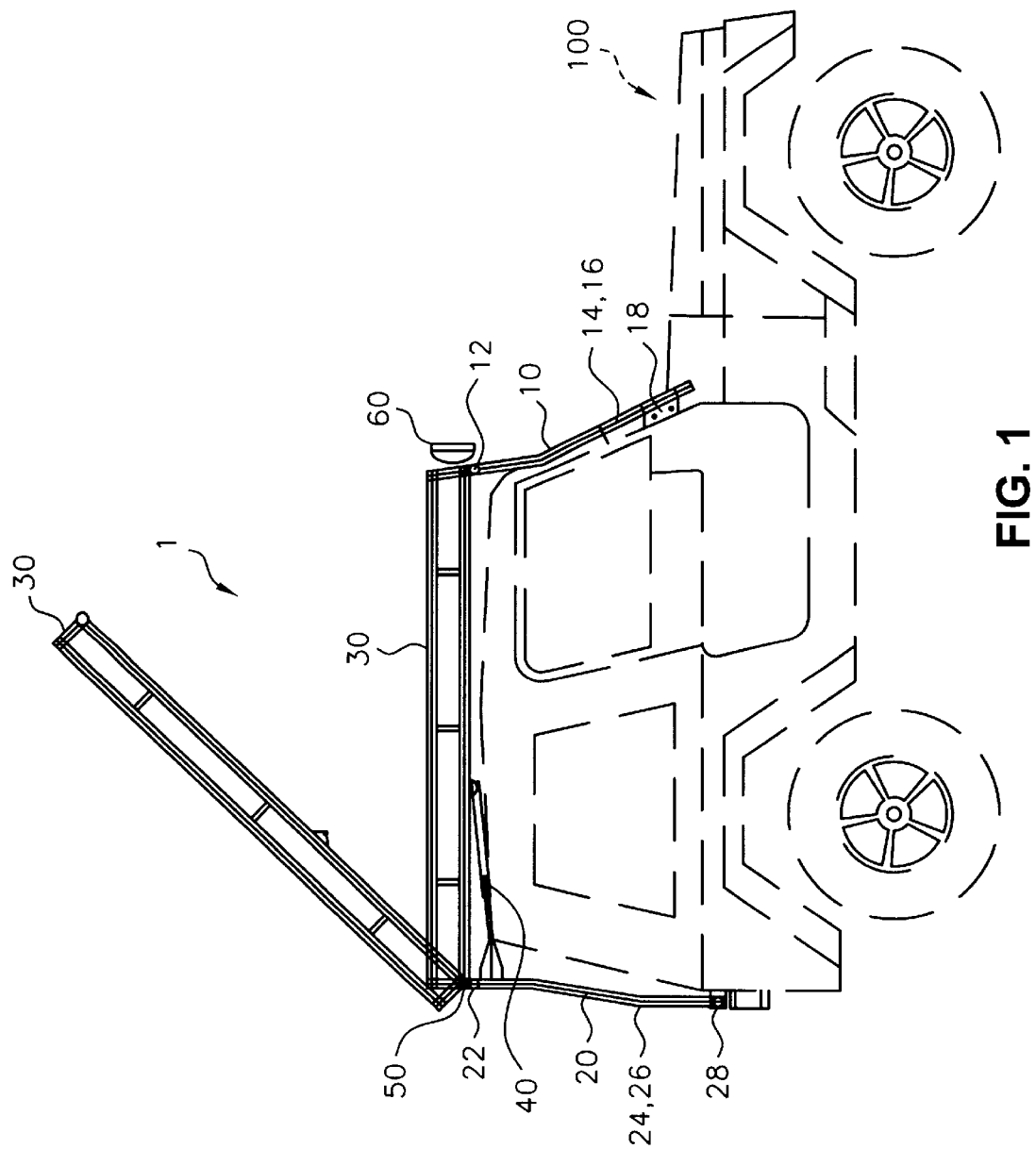
FIG. 1 is a side view of one embodiment of the utility rack of the present invention mounted to a vehicle showing how the utility rack is releasably attached to the front support bar and pivots about the rear support bar.

Referring now to the drawing, in which like reference numbers refer to like elements throughout the various figures that comprise the drawing, FIG. 1 shows a utility rack 1 for a vehicle 100, such as a SUV or an ATV, with a removable top or roof. The vehicle top can be a hard or a soft top and can be either entirely removable or retractable from a closed into an open position. The top may cover one or both of a passenger and a cargo compartment.

FIG. 1 is a side view of one embodiment of the utility rack 1 mounted to a vehicle 100. The utility rack 1 has a front U-shaped support bar 10. The front U-shaped support bar 10 has a horizontal support section 12 and two, mirror-image, left- and right-hand side, vertical mounting sections 14 and 16. The vertical mounting sections 14 and 16, of the front U-shaped support bar 10, are attached to the vehicle 100 by front mounting plate assemblies 18.

The utility rack 1 also has a rear U-shaped support bar 20. The rear U-shaped support bar 20 has a horizontal support section 22 and two, mirror-image, left- and right-hand side, vertical mounting sections 24 and 26.

The vertical mounting sections 24 and 26, of the rear U-shaped support bar 20, are attached to the vehicle 100 by rear mounting plate assemblies 28. The front and rear U-shaped support bars 10 and 20, respectively, support a bed 30. The bed 30 is attached in a releasable fashion to the front horizontal support section 12 of the front U-shaped support bar 10. Conventional hardware such as clamps, brackets, and snap-fittings may be used to releasably attach the bed 30 to the front horizontal support section 12. The rear of the bed 30 is pivotally mounted to the rear horizontal support section 22 of the rear U-shaped support bar 20.

Figure 13:
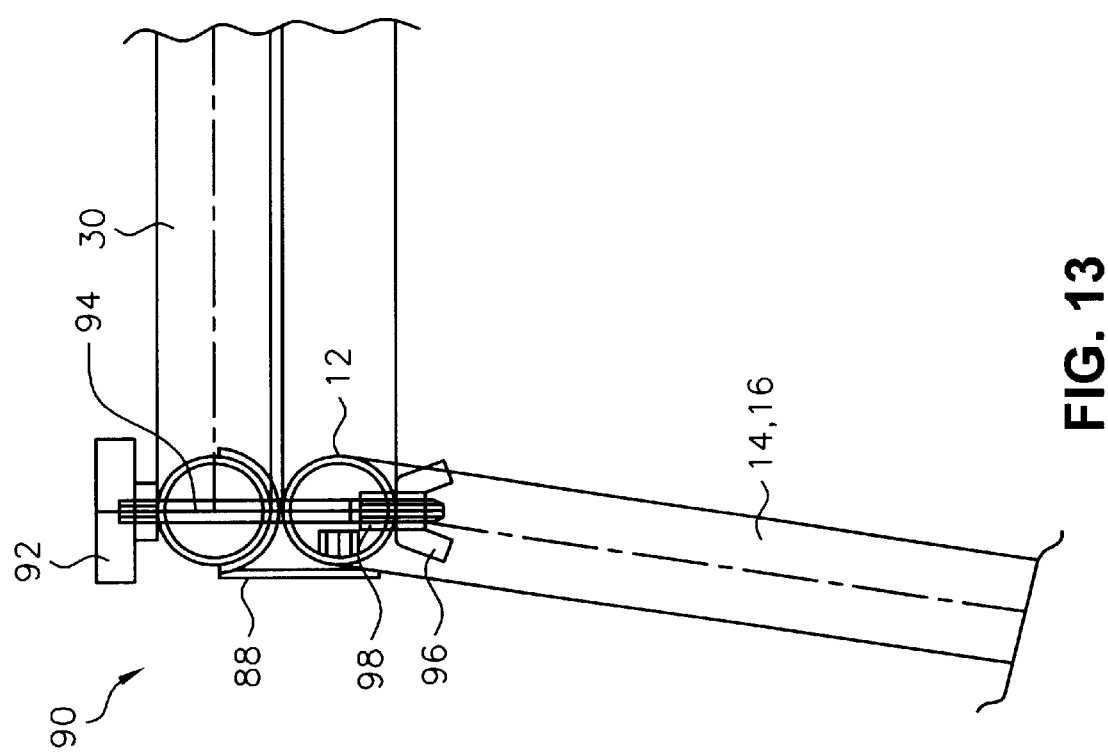
FIG. 13 is a side view of one embodiment, a clamping knob assembly, used to releasably attach the bed to the front support bar of the utility rack according to the present invention.

FIG. 13 is a side view of one embodiment, a clamping knob assembly 90, used to releasably attach the bed 30 to the front horizontal support section 12 of the utility rack 1 according to the present invention. The clamping knob assembly 90 has four components: a clamp knob 92 suitable for easy rotation by the user, a threaded rod 94 integral with the clamp knob 92 and rotated upon rotation of the clamp knob 92, a locking wing nut 96 which engages the end of the threaded rod 94 and locks the clamping knob assembly 90 in position, and a threaded insert 98. With the locking wing nut 96 removed, the threaded rod 94 passes through an opening provided in the bed 30 and engages the threaded insert 98 which is positioned in a corresponding opening in the front horizontal support section 12. The user rotates the threaded rod 94, by turning the clamp knob 92, until the threaded rod 94 fully engages and partially protrudes from the threaded insert 98. Application by the user of the locking wing nut 96 to the portion of the threaded rod 94 protruding from the threaded insert 98 locks the clamping knob assembly 90 in position and secures the bed 30 to the front horizontal support section 12 of the utility rack 1. Removal by the user of the locking wing nut 96 allows removal of the threaded rod 94 from the threaded insert 98 in the front horizontal support section 12 and from the opening in the bed 30 and, therefore, releases the bed 30 from attachment to the front horizontal support section 12.

A saddle 88 may be provided as a component of the utility rack 1. As illustrated in FIG. 13, the saddle 88 has a flat front face and a semicircular portion. The semicircular portion is positioned between the bed 30 and the front horizontal support section 12, and follows the contour of the bed 30. The flat front face is positioned against the outside surfaces of the bed 30 and the front horizontal support section 12. Thus, the saddle 88 can be used to align and space the bed 30 and the front horizontal support section 12.

Returning to FIG. 1, the bed 30 is shown in two positions. In its first and closed position, the bed 30 is attached to the front horizontal support section 12 of the front U-shaped support bar 10 and sits horizontally over and a few inches above the roof of the vehicle 100. In its second and open position, the bed 30 is detached from the front horizontal support section 12 of the front U-shaped support bar 10 and pivots upwardly away from the roof of the vehicle 100. The user gains easy access to the roof of the vehicle when the bed 30 is in its open position. Moreover, the roof can be removed or retracted by the user as desired with the bed 30 in its open position and still attached to the vehicle 100. This desirable attribute of the utility rack 1 is attained, in part, because no structure of the utility rack 1 is attached to or otherwise directly contacts the roof of the vehicle 100.

A gas spring assembly 40 is attached to the rear vertical mounting sections 24 and 26 and to the bed 30. The gas spring assembly 40 facilitates pivoting the bed 30 about the rear horizontal support section 22 of the rear U-shaped support bar 20 between the closed and open positions. Preferably, two gas assist shocks 42 are included in the gas spring assembly 40. The size of the shocks 42 will depend upon the application (including the weight to be placed on the bed 30) and the preference of the user; a pair of shocks 42 each rated at about 200 pounds will often suffice. The shocks 42 are mounted to the utility rack 1 and are located on either side of the vehicle 100. The bed 30 is supported by and pivotally mounted with a hinge 50 to the horizontal support section 22 of the rear U-shaped support bar 20.

Figure 12:
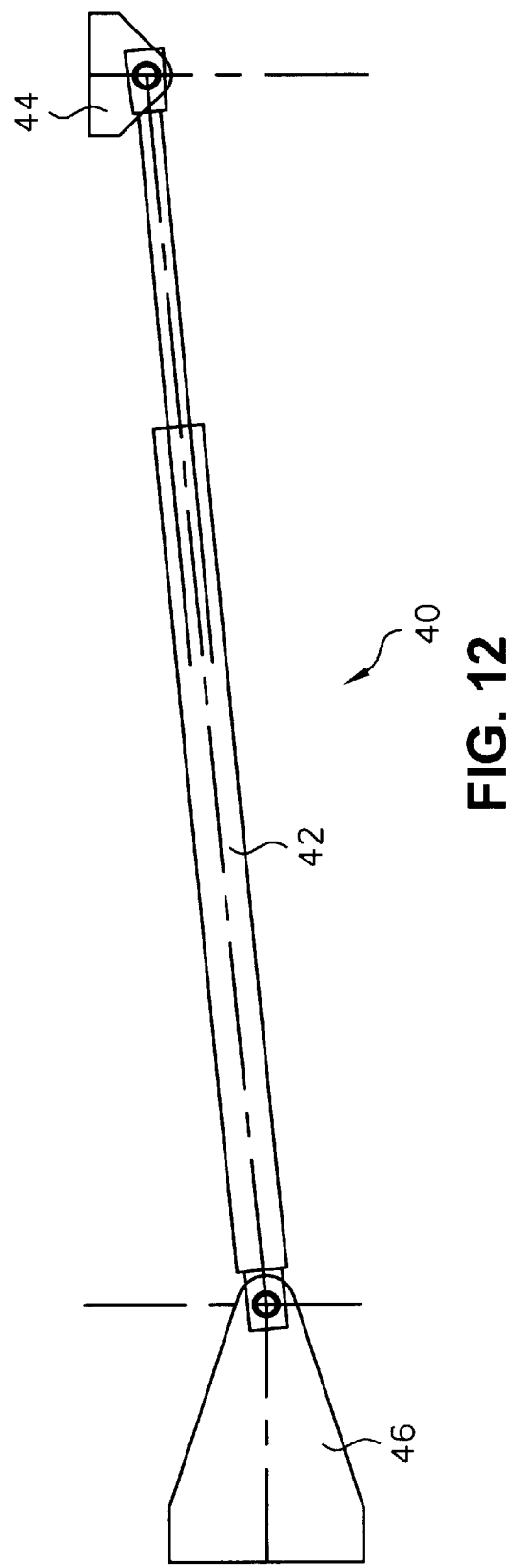
FIG. 12 is an enlarged view of the gas spring and its related mounting brackets according to the present invention.

FIG. 12 is an enlarged view of the gas spring 40 and its related components according to the present invention. In the specific embodiment shown, the gas spring 40 includes a gas assist shock 42 on either end of which is provided a mounting bracket. Front mounting bracket 44 is adapted to be secured to the bed 30; rear mounting bracket 46 is adapted to be secured to one of the vertical mounting sections 24 and 26 of the rear U-shaped support bar 20. The gas spring 40 allows the user to push the bed 30 upward, using the helpful force of the gas assist shocks 42, toward the open position. Upon full extension of the gas assist shocks 42, the bed 30 will reach, maintain, and essentially lock in a fully open position. The user pulls down on the bed 30, against the force of the gas assist shocks 42 but using the help of gravity, to bring the bed 30 into its closed position. The bed 30 can then be affixed to the front horizontal support section 12 of the front U-shaped support bar 10 using the clamping knob assembly 90. Of course, an electric motor (not shown) might be provided to assist the user with raising and lowering the bed 30 between its open and closed positions.

Figure 2:
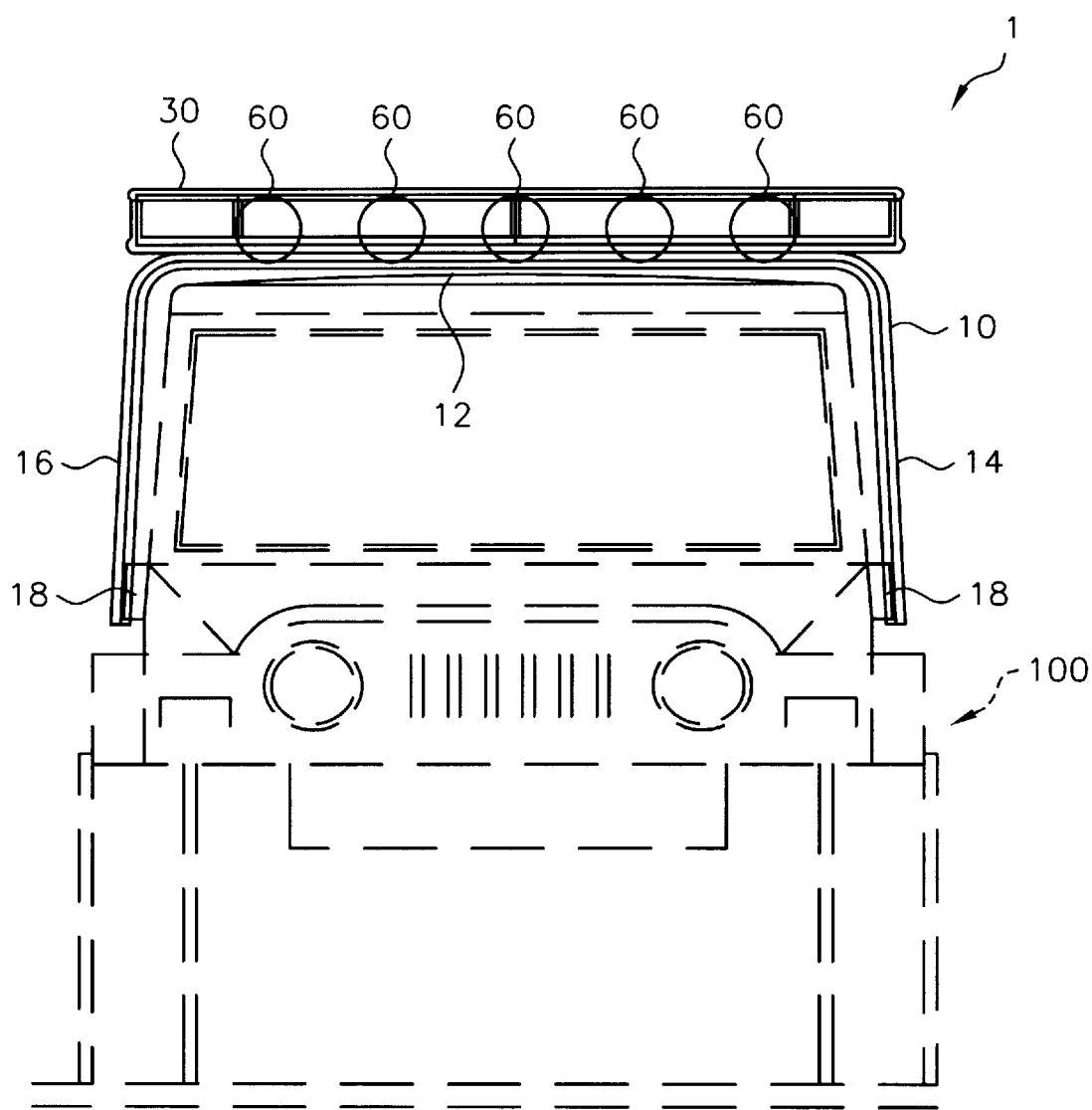
FIG. 2 is a front view of the utility rack shown in FIG. 1, highlighting the optional floodlights, mounted on a vehicle according to the present invention.

FIG. 2 is a front view of another embodiment of the utility rack 1 mounted on the vehicle 100. FIG. 2 shows the front mounting plate assemblies 18 preferably mounted to existing holes in the side panel, without blocking the doors or other components, of the vehicle 100. Conventional fasteners such as screws or bolts are inserted through holes in the front mounting plate assemblies 18 and through the corresponding holes that exist in the vehicle 100. As noted above, the front mounting plate assemblies 18 are attached to the vertical mounting sections 14 and 16 of the front U-shaped support bar 10.

Floodlights 60 may optionally be mounted to the front horizontal support section 12 of the front U-shaped support bar 10. It may be desirable in some applications or for some users not to have any floodlights 60 mounted on the front horizontal support section 12. In fact, some states do not permit floodlights 60. Alternatively, as many floodlights 60 as desired may be mounted on the front horizontal support section 12 depending on the size of the individual floodlights 60 and the width of the vehicle 100. Preferably, two to five floodlights 60 are mounted. Still more preferably, five floodlights 60 are mounted as illustrated in FIG. 2. Floodlights 60 are typically off-road lights and may be provided with a remote control switch.

Because the floodlights 60 are mounted to the front horizontal support section 12 of the front U-shaped support bar 10, the front horizontal support section 12 might also be called a "light bar." It is important to note that the floodlights 60 and the front horizontal support section 12, to which the floodlights 60 are mounted, are both disposed above all components (especially the window) of the vehicle 100. Such disposition ensures that the utility rack 1 does not interfere with the normal operation of the vehicle 1, which includes raising and lowering of the windshield as desired.

Figure 3:
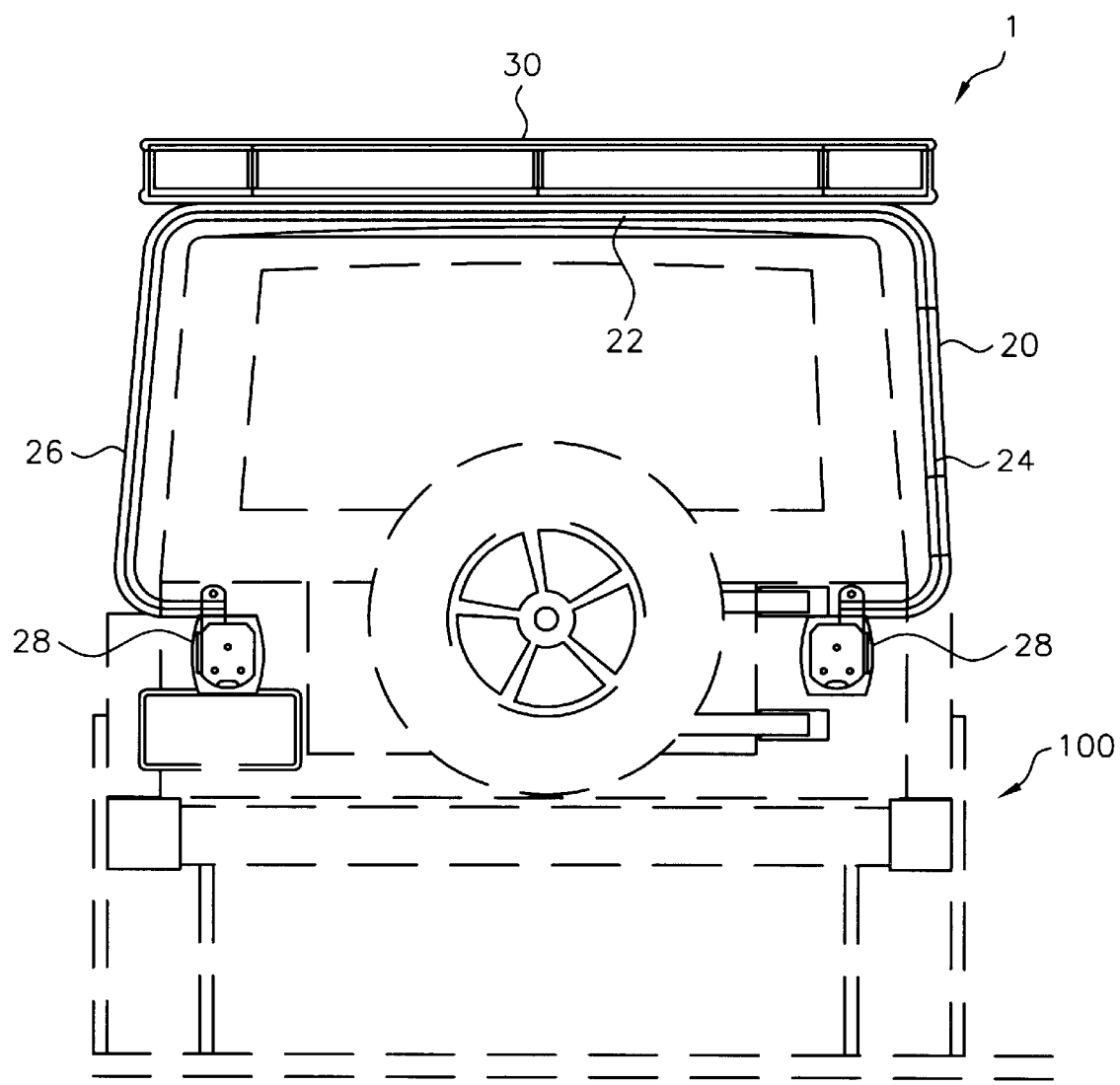
FIG. 3 is a rear view of the utility rack shown in FIG. 1 mounted on a vehicle.

FIG. 3 is a rear view of the utility rack 1 mounted on the vehicle 100 according to the present invention. The rear view of FIG. 3 shows the rear U-shaped support bar 20 with the horizontal support section 22 connected to the vertical mounting sections 24 and 26. Rear mounting plate assemblies 28 support the vertical mounting sections 24 and 26. The rear mounting plate assemblies 28 are preferably adapted to be mounted to the existing bolt holes of the tail lights, without blocking the tail lights, spare tire, or other components, of the vehicle 100. Additional holes may be formed in the vehicle 100 to accommodate the rear mounting plate assemblies 28; if formed, such additional holes are preferably sufficiently few that the rear mounting plate assemblies 28 can be attached to the vehicle 100 without substantial modification to the vehicle 100. Conventional fasteners such as screws or bolts are inserted through holes in the rear mounting plate assemblies 28 and through the corresponding holes that exist in the vehicle 100.

Figure 4:
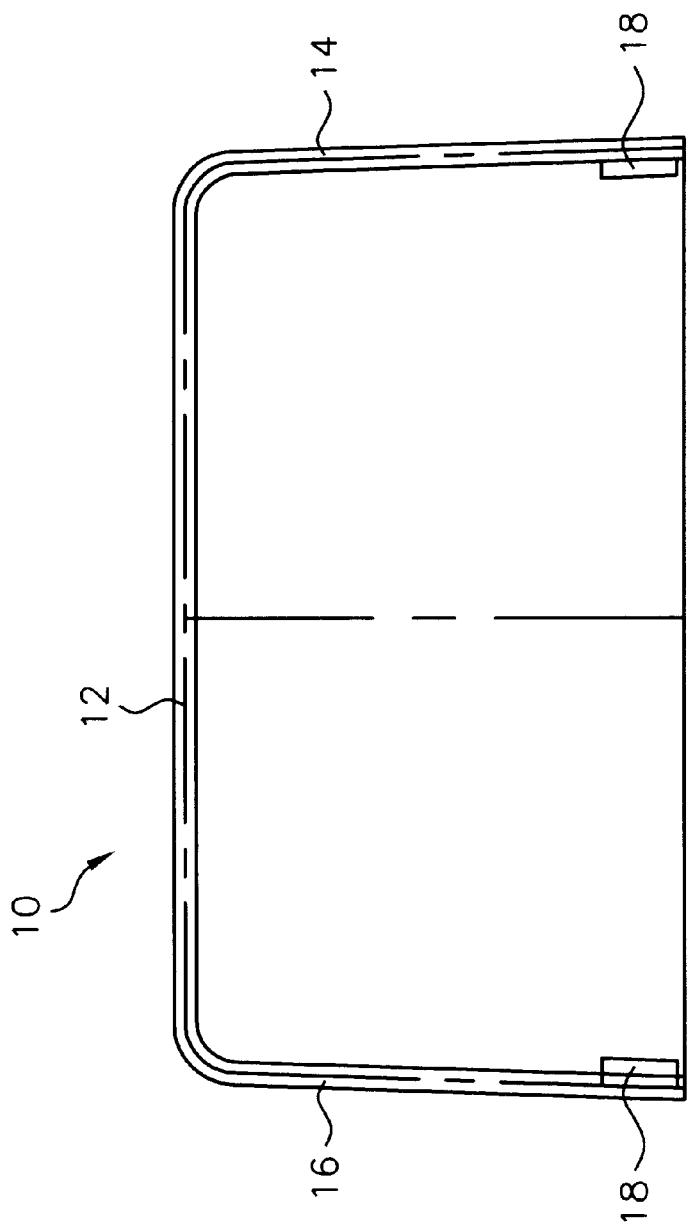
FIG. 4 is a front view of the front support bar of the vehicle utility rack according to the present invention.

FIG. 4 is a front view of the front U-shaped support bar 10 of the vehicle utility rack 1 according to the present invention. FIG. 4 shows the horizontal support section 12 and the vertical mounting sections 14 and 16. Also shown are the front mounting plate assemblies 18 attached to the vertical mounting sections 14 and 16.

Figure 5:
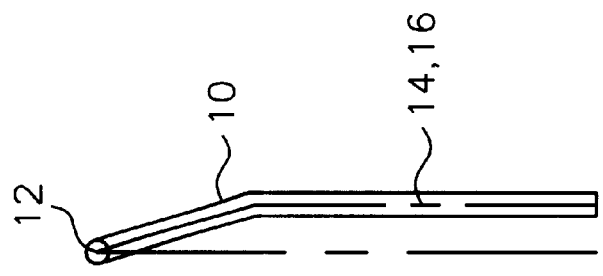
FIG. 5 is a side view of the front support bar of the vehicle utility rack shown in FIG. 4.

FIG. 5 is a side view of the front U-shaped support bar 10 of the vehicle utility rack 1 according to the present invention. The side view of FIG. 5 shows how, in this particular embodiment, the vertical mounting sections 14 and 16 are slightly bent. The bent shape of the vertical mounting sections 14 and 16 allows the horizontal support bar 12 to be separated from, supported on, and positioned best with respect to the vehicle 100. The bent shape of the vertical mounting sections 14 and 16 also allows for the optional floodlights 60 to be mounted on the front horizontal support bar 12 in a suitable position with respect to the vehicle 100.

FIG. 6 is a front view of the rear U-shaped support bar 20 of the vehicle utility rack 1 according to the present invention. The rear mounting plate assemblies 28 support the vertical mounting sections 24 and 26. Illustrated on the rear mounting plate assemblies 28 are a series of openings 34 used to affix the utility rack 1 to the rear of the vehicle 100. Attached to the vertical mounting sections 24 and 26 is the rear horizontal support section 22. The rear horizontal support section 22 has apertures 32 which are adapted to connect the pivoting mechanism for the bed 30.

FIG. 7 is a top view of the rear U-shaped support bar 20 of the vehicle utility rack 1 according to the present invention. FIG. 7 shows the rear mounting plate assemblies 28, which support the vertical mounting sections 24 and 26. This view also illustrates that the junction between the rear mounting plate assemblies 28 and the vehicle 100, and the back edge of the rear horizontal support section 22, lies in substantially the same vertical plane.

FIG. 8 is a side view of the rear U-shaped support bar 20 of the vehicle utility rack 1 according to the present invention. FIG. 8 shows the rear mounting plate assemblies 28 supporting the vertical mounting sections 24 and 26 attached to the rear horizontal support section 22. The side view of FIG. 8 shows how, in this particular embodiment, the vertical mounting sections 24 and 26 are bent at two points to create a slight "S" shape. The bent shape of the vertical mounting sections 24 and 26 allows the horizontal support section 22 to be separated from, supported on, and positioned best with respect to the vehicle 100.

Figure 9:
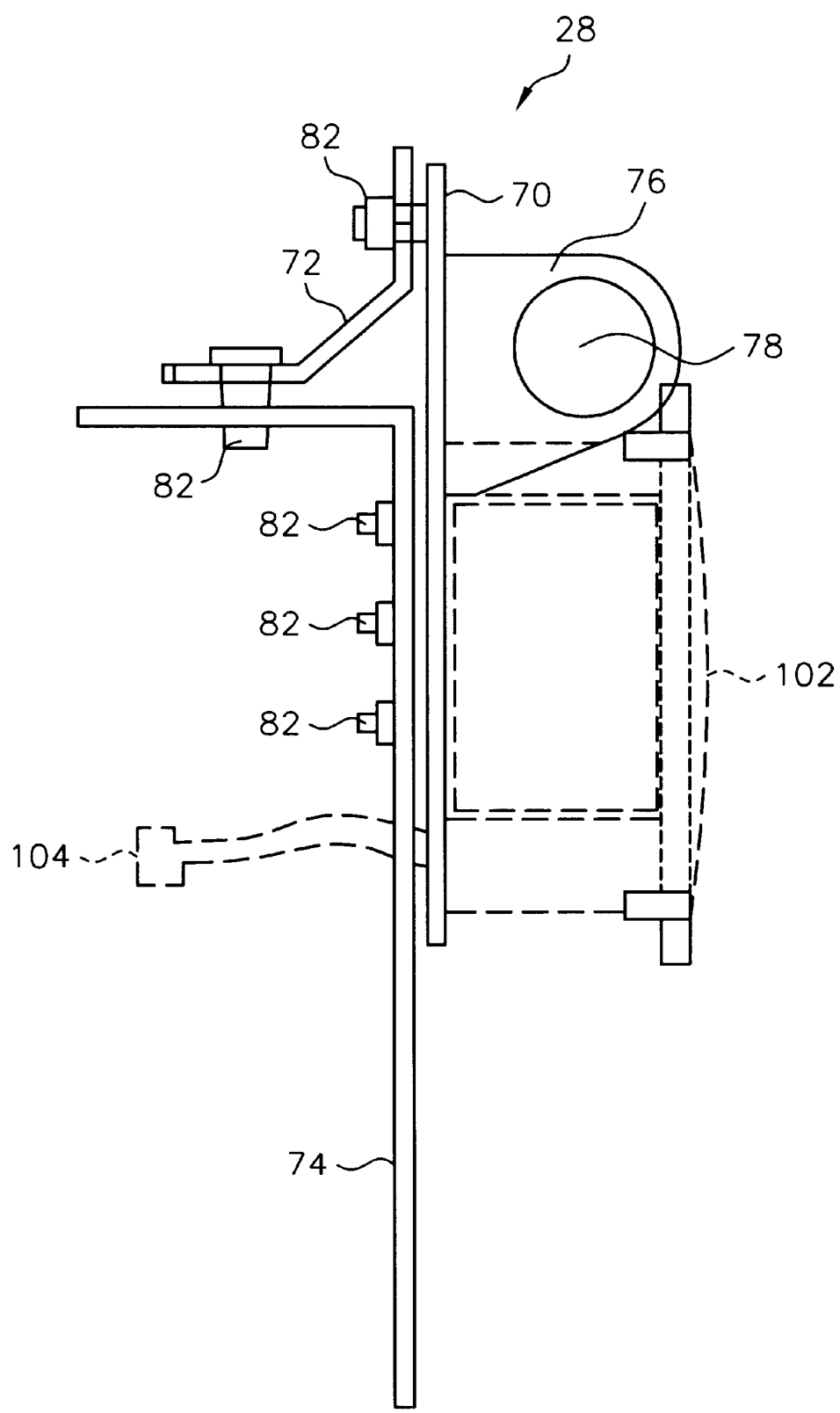
FIG. 9 is an enlarged side view of one embodiment of the rear mounting assembly according to the present invention.

FIG. 9 is an enlarged side view of an embodiment of the rear mounting plate assembly 28 according to the present invention. The rear mounting plate assembly 28 is adapted to attach to existing bolt holes of the tail lights 102 of the vehicle 100. In the embodiment illustrated in FIG. 9, a few additional holes have been formed in the vehicle 100 (without substantial modification to the vehicle 100) and the rear mounting plate assembly 28 has three components: an outside mounting plate 70, a top inside mounting plate 72, and a bottom inside mounting plate 74. The outside mounting plate 70 has a pair of flanges 76, each forming a bore 78 that receives one of the vertical mounting sections 24 and 26 (as shown in FIGS. 6–8). Provided in the outside mounting plate 70 is a passage 80 (see FIG. 6) permitting the electrical conduit 104 of the tail light 102 to access the vehicle 100. A plurality of conventional fasteners 82 are used to connect the three components of the rear mounting plate assembly 28 to each other and to the vehicle 100.

Figure 10:
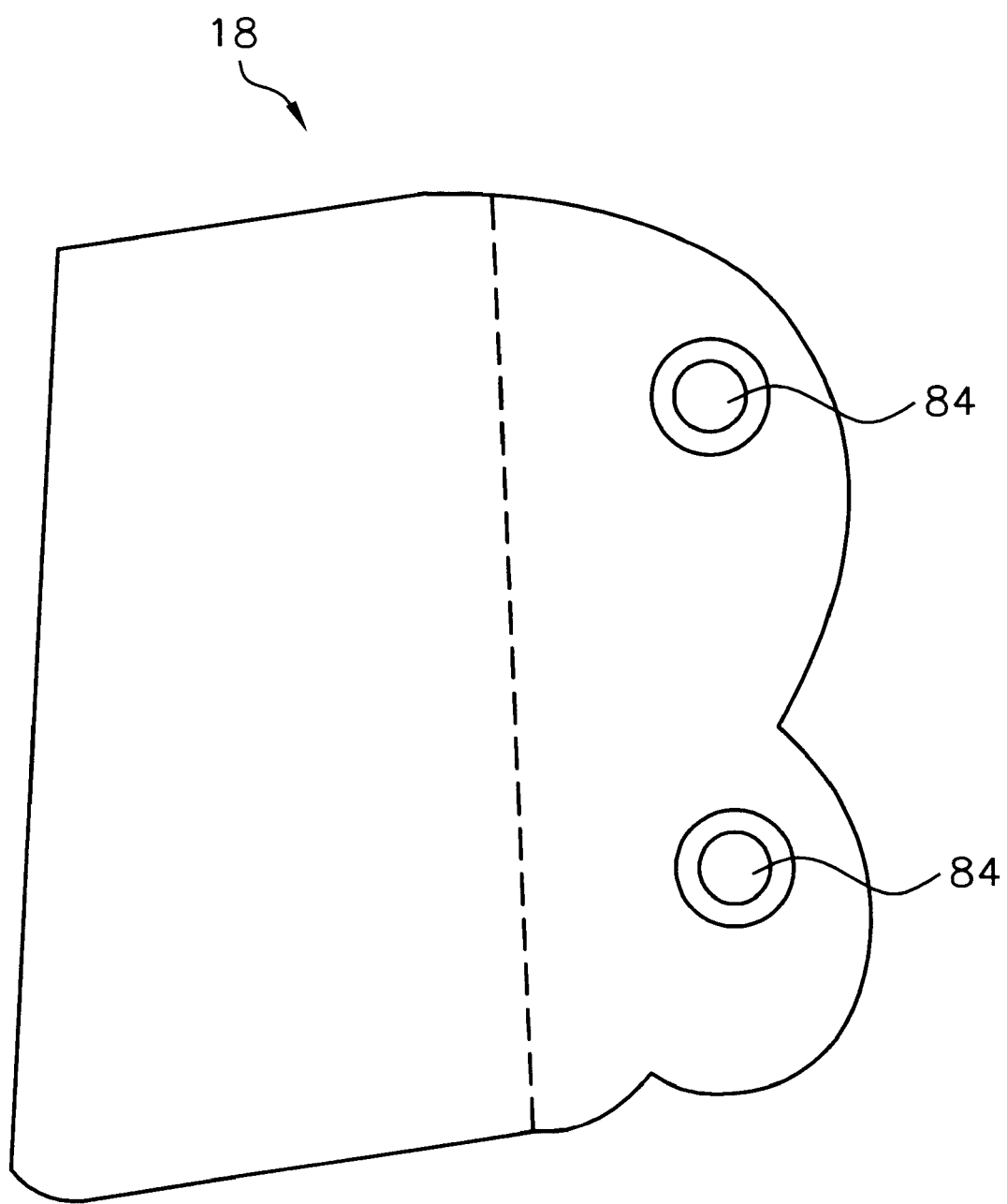
FIG. 10 is an enlarged view of one embodiment of the front mounting assembly according to the present invention.

FIG. 10 is an enlarged view of an embodiment of the front mounting plate assembly 18 according the present invention. The front mounting plate assembly 18 is adapted to attach to existing bolt holes in the vehicle 100. In a preferred embodiment, the front mounting plate assembly 18 is designed to attach to existing bolt holes just below the front windshield hinge of the vehicle 100. Thus, the utility rack 1 permits full operation of the windshield (e.g., lowering and raising). The front mounting plate assembly 18 includes one or more holes 84 positioned and configured to correspond with suitable holes in the vehicle 100.

Figure 11:
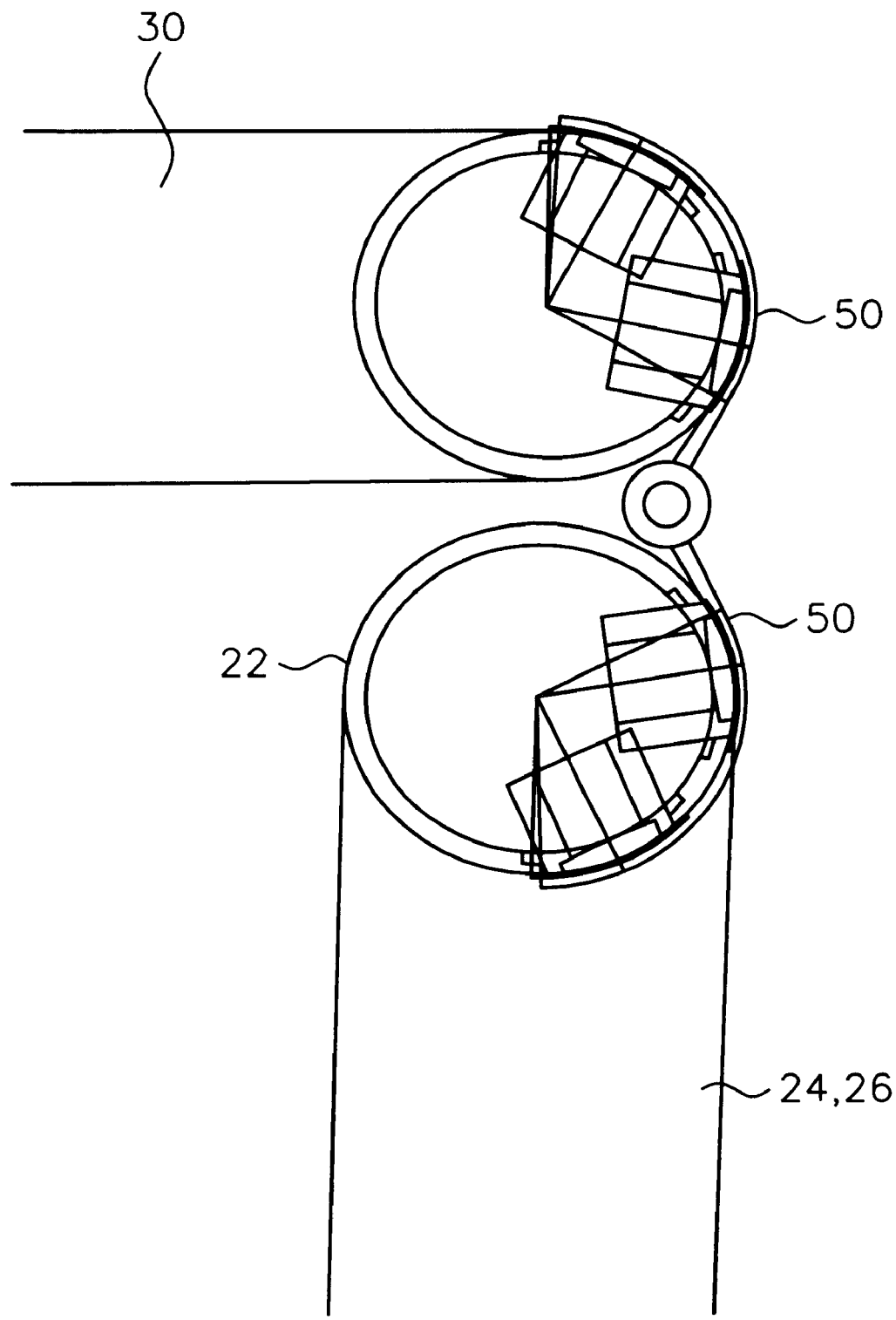
FIG. 11 is an enlarged cross-section of one embodiment of the hinge mechanism according to the present invention.

FIG. 11 is an enlarged cross-section of an embodiment of the hinge 50 which allows the bed 30 to pivot about the rear horizontal support section 22 of the rear U-shaped support bar 20 at the top of the vertical mounting sections 24 and 26. The hinge 50 of FIG. 11 is adapted to be bolted, screwed, or otherwise affixed to both the bed 30 and the rear horizontal support section 22. Alternatively, the hinge 50 may be an integral, continuous, monolithic part of the bed 30 and the rear horizontal support section 22.

By allowing rotation between components, the hinge 50 allows the front of the bed 30 to be lifted from the front horizontal support section 12 of the front U-shaped support bar 10. In this particular embodiment of the present invention, the bed 30 pivots on the rear horizontal support section 22. In other embodiments, the bed 30 may pivot on the front horizontal support section 12 or on a side support bar. In any embodiment, the pivoting bed 30 will not impinge upon the removal of the hard or soft temporary top or roof of the vehicle 100.

Figure 14:
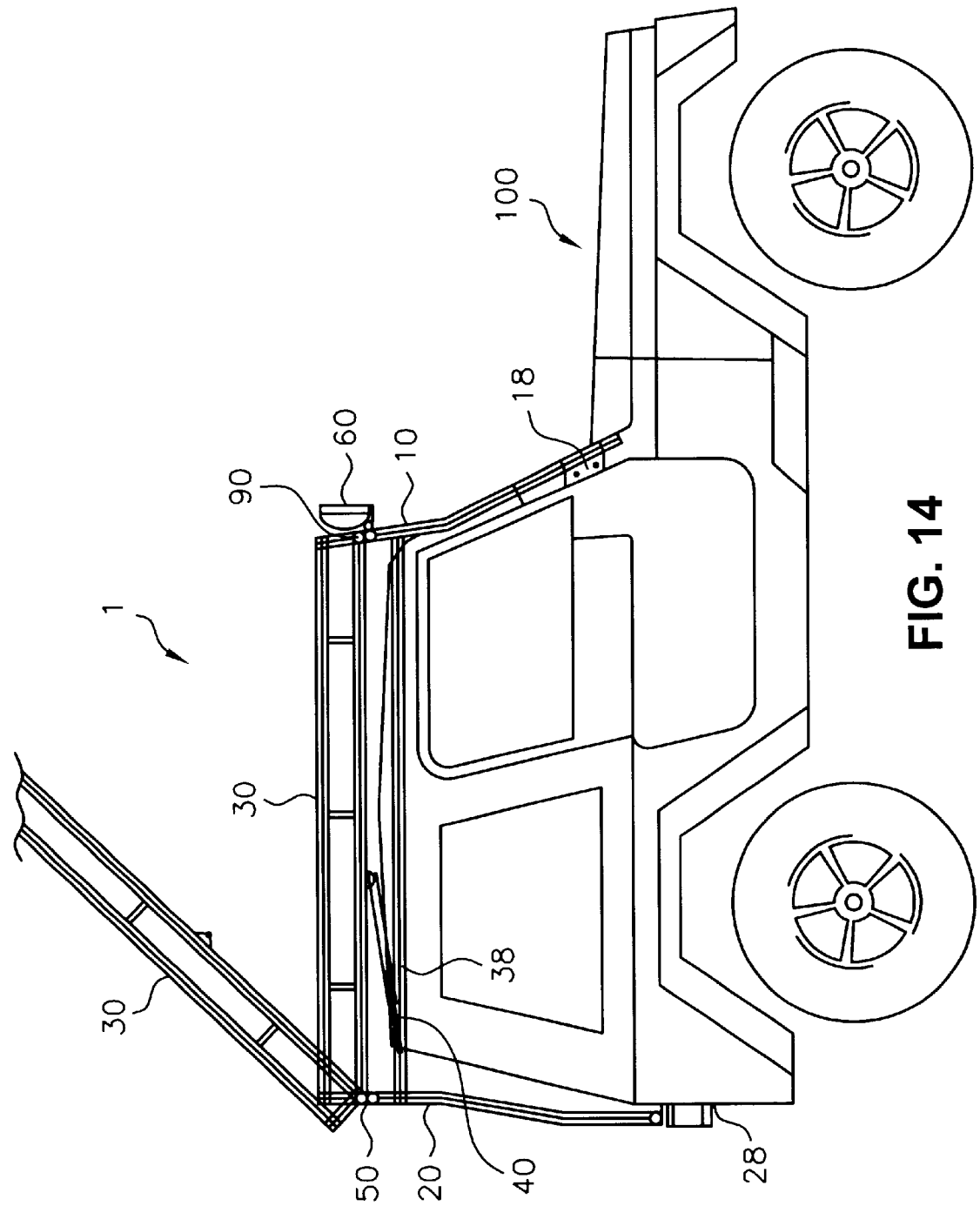
FIG. 14 is a side view of another embodiment of the utility rack of the present invention mounted to a vehicle.

FIG. 14 is a side view of another embodiment of the utility rack 1 mounted to a vehicle 100. In this embodiment of the utility rack 1, one additional component is provided and one of the components illustrated in the embodiment of FIG. 1 has been modified. The additional component is a side stiffening bar 38. Two side stiffening bars 38 may be provided, one on each side of the utility rack 1. The side stiffening bars 38 are affixed to and extend between the front support bar 10 and the rear support bar 20. Thus, the side stiffening bars 38 add rigidity and structural support to the utility rack 1.

The modified component is the gas spring assembly 40. As illustrated in FIG. 12, the gas spring assembly 40 has a front mounting bracket 44 secured to the bed 30 and a rear mounting bracket 46 secured to the rear support bar 20. The inclusion of the side stiffening bars 38 in the embodiment of FIG. 14 allows the gas spring assemblies 40 to be attached to the side stiffening bars 38 rather than to the rear support bar 20. Therefore, the gas spring assembly 40 does not need a rear mounting bracket 46 and none is shown in FIG. 14. The side stiffening bars 38 thus function to mount the gas spring assemblies 40.

The utility rack 1 of the present invention may be constructed of durable, lightweight material. Such material may include but is not limited to aluminum, steel, carbon fiber, composite, or other suitable material. The utility rack 1 may be made of a high-impact plastic, and may also be molded in part or in its entirety. Preferably the material has rust-resistant properties or is imparted with a rust-resistant coating. In one embodiment, the utility rack 1 is made of 1.5 inch diameter steel tubing that is welded for strength.

The present invention may be constructed as a unitary, monolithic, welded rack providing maximum strength and eliminating rattling from bolt-loosening present in the prior art. Alternatively, the utility rack 1 of the present invention may include separate components that may be bolted, threaded, or preferable welded together. This alternative allows the various components to be transported and installed more easily. It also offers other advantages: specifically, the light bar may be marketed and provided as an entirely stand-alone component. In either case, whether unitary or formed of separate components, the utility rack 1 of the present invention may be provided assembled on a new vehicle or provided as a separate kit suitable for retroactively upgrading a used vehicle.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. For example, the figures depict rounded bars and illustrate the front and rear support bars configured in a U-shape; other cross sections and shapes may also be used.

What is claimed:

1. A utility rack adapted to be disposed on and external to a vehicle having a top, the utility rack comprising:
    a bed adapted to support objects;
    a first support bar attached to the vehicle and supporting the bed;
    a second support bar attached to the vehicle and supporting the bed when contacting the bed;
    a hinge pivotally connecting the first support bar to the bed, enabling the bed to pivot about the first support bar; and
    means for releasably connecting the second support bar to the bed, wherein the bed pivots between (a) a closed position in which the bed covers the top of the vehicle and the releasable means connects the second support bar to the bed, and (b) an open position in which the releasable means is disconnected and the bed is disposed away from the second support bar thereby rendering the top accessible.

2. The utility rack of claim 1, wherein the utility rack nowhere contacts the top of the vehicle.

3. The utility rack of claim 1, wherein the top of the vehicle is one of removable and retractable and the utility rack permits removal or retraction of the top when the bed is in the open position.

4. The utility rack of claim 1, further comprising at least one floodlight mounted to the second support bar.

5. The utility rack of claim 1, wherein the bed, first support bar, and second support bar are constructed of a durable, rigid, rust-resistant material.

6. The utility rack of claim 1, further comprising means attached to the bed for facilitating pivot of the bed between the open and closed positions.

7. The utility rack of claim 6, wherein the facilitating means includes a gas spring assembly.

8. The utility rack of claim 1, wherein the first support bar includes a first horizontal support section and two first vertical mounting sections attached to the vehicle by first mounting plate assemblies and the second support bar includes a second horizontal support section and two second vertical mounting sections attached to the vehicle by second mounting plate assemblies.

9. The utility rack of claim 8, wherein the two first mounting plate assemblies and the two second mounting plate assemblies are attached to the vehicle without substantial modification of the vehicle.

10. The utility rack of claim 8, wherein the two first vertical mounting sections and the two second vertical mounting sections are bent to position the utility rack with respect to the vehicle.

11. A utility rack adapted to be disposed on and external to a vehicle having holes for mounting conventional vehicle components and a temporary top, the utility rack comprising:
    a bed adapted to support objects;
    a first support bar (a) including a first horizontal support section and two first vertical mounting sections attached to the vehicle by first mounting plate assemblies using the holes of the vehicle, and (b) supporting the bed;
    a second support bar (a) including a second horizontal support section and two second vertical mounting sections attached to the vehicle by second mounting plate assemblies using the holes of the vehicle, and (b) supporting the bed when contacting the bed;
    a hinge pivotally connecting the first horizontal support section of the first support bar to the bed, enabling the bed to pivot about the first horizontal support section of the first support bar;
    means for releasably connecting the second horizontal support section of the second support bar to the bed, wherein the releasable means comprises a clamping knob assembly, wherein the bed pivots between (a) a closed position in which the bed covers the top of the vehicle and the releasable means connects the second horizontal support section of the second support bar to the bed, and (b) an open position in which the releasable means is disconnected and the bed is disposed away from the second horizontal support section of the second support bar thereby rendering the top accessible; and means attached to the bed for facilitating pivot of the bed between the open and closed positions, wherein the utility rack nowhere contacts the top of the vehicle but permits removal or retraction of the top when the bed is in the open position.

12. The utility rack of claim 11, wherein the facilitating means includes a gas spring assembly.

13. The utility rack of claim 11, further comprising at least one floodlight mounted to the second support bar.

14. The utility rack of claim 11, wherein the two first vertical mounting sections and the two second vertical mounting sections are bent to position the utility rack with respect to the vehicle.

15. The utility rack of claim 11, wherein the bed, first support bar, and second support bar are constructed of a durable, rigid, rust-resistant material.

16. A utility rack adapted to be disposed on and external to a vehicle having holes for mounting conventional vehicle components and a temporary top, the utility rack comprising:

a bed adapted to support objects;

a first support bar (a) including a first horizontal support section and two first vertical mounting sections attached to the vehicle by first mounting plate assemblies using the holes of the vehicle, and (b) supporting the bed;

a second support bar (a) including a second horizontal support section and two second vertical mounting sections attached to the vehicle by second mounting plate assemblies using the holes of the vehicle, and (b) supporting the bed when contacting the bed;

a hinge pivotally connecting the first horizontal support section of the first support bar to the bed, enabling the bed to pivot about the first horizontal support section of the first support bar;

a clamping knob assembly releasably connecting the second horizontal support section of the second support bar to the bed, wherein the bed pivots between (a) a closed position in which the bed covers the top of the vehicle and the clamping knob assembly connects the second horizontal support section of the second support bar to the bed, and (b) an open position in which the clamping knob assembly is disconnected and the bed is disposed away from the second horizontal support section of the second support bar thereby rendering the top accessible; and a gas spring assembly attached to the bed facilitating pivot of the bed between the open and closed positions, wherein the utility rack nowhere contacts the top of the vehicle but permits removal or retraction of the top when the bed is in the open position.

17. The utility rack of claim 16, further comprising at least one floodlight mounted to the second support bar.

18. The utility rack of claim 16, wherein the two first vertical mounting sections and the two second vertical mounting sections are bent to position the utility rack with respect to the vehicle.

* * * * *